(12) United States Patent
Kraenzel

(10) Patent No.: US 9,288,000 B2
(45) Date of Patent: Mar. 15, 2016

(54) MONITORING A COMMUNICATION AND RETRIEVING INFORMATION RELEVANT TO THE COMMUNICATION

(75) Inventor: Carl Joseph Kraenzel, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2270 days.

(21) Appl. No.: 10/736,848

(22) Filed: Dec. 17, 2003

(65) Prior Publication Data

US 2005/0160166 A1    Jul. 21, 2005

(51) Int. Cl.
    *G06F 17/30*    (2006.01)
    *H04H 60/48*    (2008.01)

(52) U.S. Cl.
    CPC ....................... *H04H 60/48* (2013.01)

(58) Field of Classification Search
    CPC ..................... G06F 17/30011; H04H 60/48
    USPC ............................. 707/3, 4, 5; 709/203, 204
    See application file for complete search history.

(56) References Cited

U.S. PATENT DOCUMENTS

| | | | |
|---|---|---|---|
| 4,744,028 A | 5/1988 | Karmarkar | 364/402 |
| 5,642,502 A | 6/1997 | Driscoll | |
| 5,740,549 A | 4/1998 | Reilly et al. | 705/14 |
| 5,761,512 A | 6/1998 | Breslau et al. | 395/705 |
| 5,771,378 A | 6/1998 | Holt et al. | |
| 5,815,830 A * | 9/1998 | Anthony | 707/6 |

(Continued)

FOREIGN PATENT DOCUMENTS

| | | |
|---|---|---|
| EP | 1 087 306 | 3/2001 |
| EP | 1 143 356 | 10/2001 |

OTHER PUBLICATIONS

David W. McDonald, Evaluating Expertise Recommendations, Sep. 2001, pp. 214-223.*

(Continued)

*Primary Examiner* — Glenford Madamba
(74) *Attorney, Agent, or Firm* — Cuenot, Forsythe & Kim, LLC

(57) ABSTRACT

A system, method, and computer readable medium for monitoring a communication, and providing users with information retrieved from one or more data sources that may be relevant to the communication. An information module monitors a communication associated with at least one remote client by receiving either all (or a portion of) the communication as input. The information module then analyzes the communication to filter out and produce a running list of words that may define the context or key topics of the communication. One or more of the topic words are then used as search terms in a search executed against one or more data sources. The search results may then be forwarded to the remote client in real-time, according to one or more specified parameters. In this regard, a user of a remote client does not have to formulate their own search terms, or even activate the search, while engaged in a communication. By coupling the information module to one or more data sources, a user of a remote client may be presented with access to knowledge reports of experts, various documents, information, or other resources relevant to the context of the communication to which they may currently be associated. This empowers the user with knowledge and expertise sources that match the evolution of the topic(s) of the communication.

59 Claims, 5 Drawing Sheets

(56) References Cited

U.S. PATENT DOCUMENTS

| | | | |
|---|---|---|---|
| 5,842,009 A | 11/1998 | Borovoy et al. | |
| 5,895,470 A | 4/1999 | Pirolli et al. | 707/102 |
| 5,966,707 A | 10/1999 | Van Huben et al. | 707/10 |
| 6,012,053 A | 1/2000 | Pant et al. | |
| 6,014,661 A | 1/2000 | Ahlberg et al. | |
| 6,041,311 A | 3/2000 | Chislenko et al. | 705/27 |
| 6,041,323 A | 3/2000 | Kubota | |
| 6,078,918 A | 6/2000 | Allen et al. | 707/6 |
| 6,098,034 A | 8/2000 | Razin et al. | |
| 6,115,709 A | 9/2000 | Gilmour et al. | 707/9 |
| 6,144,944 A | 11/2000 | Kurtzman, II et al. | 705/14 |
| 6,154,783 A | 11/2000 | Gilmour et al. | 709/245 |
| 6,182,077 B1 | 1/2001 | Tokumine et al. | 707/10 |
| 6,205,472 B1 | 3/2001 | Gilmour | 709/206 |
| 6,208,994 B1 | 3/2001 | Abdelnur | 707/103 |
| 6,226,648 B1 | 5/2001 | Appleman et al. | 707/102 |
| 6,240,466 B1 | 5/2001 | McKeehan et al. | 709/316 |
| 6,249,784 B1 | 6/2001 | Macke et al. | |
| 6,253,202 B1 | 6/2001 | Gilmour | |
| 6,269,369 B1 | 7/2001 | Robertson | 707/10 |
| 6,349,295 B1 | 2/2002 | Tedesco et al. | 707/3 |
| 6,353,840 B2 | 3/2002 | Saito et al. | 707/517 |
| 6,363,377 B1 | 3/2002 | Kravets et al. | |
| 6,377,949 B1 | 4/2002 | Gilmour | 707/10 |
| 6,377,983 B1 | 4/2002 | Cohen et al. | 709/217 |
| 6,385,619 B1 | 5/2002 | Eichstaedt et al. | |
| 6,397,203 B1 | 5/2002 | Hembry | 707/2 |
| 6,405,195 B1 | 6/2002 | Ahlberg | |
| 6,405,197 B2 | 6/2002 | Gilmour | 707/5 |
| 6,421,669 B1 | 7/2002 | Gilmour et al. | 707/9 |
| 6,480,830 B1 | 11/2002 | Ford et al. | |
| 6,513,039 B1 | 1/2003 | Kraenzel | 707/9 |
| 6,516,350 B1 | 2/2003 | Lumelsky et al. | 709/226 |
| 6,523,026 B1 | 2/2003 | Gillis | 707/3 |
| 6,553,365 B1 | 4/2003 | Summerlin et al. | 707/2 |
| 6,560,588 B1 | 5/2003 | Minter | 706/50 |
| 6,564,217 B2 | 5/2003 | Bunney et al. | 707/10 |
| 6,571,279 B1 | 5/2003 | Herz et al. | 709/217 |
| 6,601,026 B2 * | 7/2003 | Appelt et al. | 704/9 |
| 6,604,110 B1 | 8/2003 | Savage et al. | 707/102 |
| 6,626,957 B1 | 9/2003 | Lippert et al. | 715/513 |
| 6,633,916 B2 | 10/2003 | Kauffman | 709/229 |
| 6,640,229 B1 | 10/2003 | Gilmour et al. | 707/9 |
| 6,647,384 B2 | 11/2003 | Gilmour | 707/5 |
| 6,654,735 B1 * | 11/2003 | Eichstaedt et al. | 707/749 |
| 6,668,251 B1 | 12/2003 | Goldberg | 707/5 |
| 6,687,873 B1 | 2/2004 | Ballantyne et al. | 715/500 |
| 6,697,793 B2 | 2/2004 | McGreevy | |
| 6,697,800 B1 | 2/2004 | Jannink et al. | 707/5 |
| 6,711,570 B1 | 3/2004 | Goldberg et al. | 707/6 |
| 6,714,936 B1 | 3/2004 | Nevin, III | 707/102 |
| 6,718,366 B2 * | 4/2004 | Beck et al. | 709/204 |
| 6,721,728 B2 | 4/2004 | McGreevy | |
| 6,732,331 B1 | 5/2004 | Alexander | 715/513 |
| 6,738,759 B1 | 5/2004 | Wheeler et al. | |
| 6,741,981 B2 | 5/2004 | McGreevy | |
| 6,754,648 B1 | 6/2004 | Fittges et al. | 707/1 |
| 6,772,137 B1 | 8/2004 | Hurwood et al. | 707/2 |
| 6,789,054 B1 | 9/2004 | Makhlouf | 703/6 |
| 6,801,940 B1 | 10/2004 | Moran et al. | 709/224 |
| 6,816,456 B1 | 11/2004 | Tse-Au | 370/230.1 |
| 6,823,333 B2 | 11/2004 | McGreevy | |
| 6,832,224 B2 | 12/2004 | Gilmour | 707/100 |
| 6,836,797 B2 | 12/2004 | Givoly et al. | 709/223 |
| 6,883,001 B2 | 4/2005 | Abe | 707/10 |
| 6,920,459 B2 | 7/2005 | Dedhia et al. | |
| 6,976,018 B2 * | 12/2005 | Teng et al. | 707/3 |
| 6,996,612 B1 | 2/2006 | Jayaram et al. | 707/204 |
| 7,003,513 B2 | 2/2006 | Geiselhart | |
| 7,043,698 B2 | 5/2006 | Newbold | 715/789 |
| 7,058,624 B2 | 6/2006 | Masters | |
| 7,092,938 B2 * | 8/2006 | Brown et al. | 707/4 |
| 7,113,954 B2 | 9/2006 | Vogel | |
| 7,152,059 B2 * | 12/2006 | Monteverde | 707/3 |
| 7,185,001 B1 * | 2/2007 | Burdick et al. | 707/3 |
| 7,206,778 B2 * | 4/2007 | Bode et al. | 707/5 |
| 7,257,589 B1 * | 8/2007 | Hull et al. | 707/608 |
| 7,305,381 B1 | 12/2007 | Poppink et al. | 707/3 |
| 7,698,255 B2 | 4/2010 | Goodwin et al. | 707/3 |
| 7,698,303 B2 | 4/2010 | Goodwin et al. | 707/200 |
| 7,853,574 B2 | 12/2010 | Kraenzel et al. | |
| 8,838,588 B2 | 9/2014 | Ruvolo et al. | |
| 2001/0049688 A1 * | 12/2001 | Fratkina et al. | 707/104.1 |
| 2002/0049621 A1 | 4/2002 | Bruce | 705/7 |
| 2002/0049750 A1 | 4/2002 | Venkatram | 707/3 |
| 2002/0078003 A1 | 6/2002 | Krysiak et al. | 707/1 |
| 2002/0087600 A1 | 7/2002 | Newbold | 707/514 |
| 2002/0107861 A1 | 8/2002 | Clendinning et al. | 707/101 |
| 2002/0111934 A1 | 8/2002 | Narayan | 707/1 |
| 2002/0143562 A1 | 10/2002 | Lawrence | 705/1 |
| 2002/0152244 A1 | 10/2002 | Dean et al. | 707/530 |
| 2003/0028525 A1 | 2/2003 | Santos et al. | 707/3 |
| 2003/0074409 A1 | 4/2003 | Bentley | |
| 2003/0105732 A1 | 6/2003 | Kagalwala et al. | 707/1 |
| 2003/0126583 A1 | 7/2003 | Cho et al. | 717/104 |
| 2003/0154212 A1 | 8/2003 | Schirmer et al. | 707/103 |
| 2004/0068477 A1 | 4/2004 | Gilmour et al. | 707/1 |
| 2004/0088325 A1 | 5/2004 | Elder et al. | 707/104.1 |
| 2004/0111386 A1 | 6/2004 | Goldberg et al. | 707/1 |
| 2004/0122681 A1 | 6/2004 | Ruvolo et al. | |
| 2004/0122803 A1 | 6/2004 | Dom et al. | |
| 2004/0205548 A1 | 10/2004 | Bax et al. | 715/513 |
| 2005/0071328 A1 | 3/2005 | Lawrence | |
| 2005/0198559 A1 | 9/2005 | Fujiwara | |
| 2006/0047635 A1 | 3/2006 | Kraenzel et al. | |
| 2006/0206480 A1 | 9/2006 | Heidloff et al. | |
| 2006/0224552 A1 | 10/2006 | Riezler et al. | |
| 2006/0230012 A1 | 10/2006 | Ruvolo et al. | |

OTHER PUBLICATIONS

U.S. Appl. No. 60/482,171 to Song et al, Jun. 24, 2003, all pages.*
Maybury et al., "Expert Finding for Collaborative Virtual Environments", *Communications of the ACM*, vol. 44, No. 12, Dec. 2001, pp. 1, 2, 55, 56.
Mattox et al., "Enterprise Expert and Knowledge Discovery", *Proceedings of the International Conference on Human Computer Interaction Conference*, Aug. 23-27, 1999, Munich, Germany, 11 pages.
"Automated Expertise Profiling Saves Time", http://www.tacit.com/products/profiling.html, printed Jan. 9, 2002, 3 pages.
"KnowledgeMail", http://www.tacit.com/products/knowledgemail.html, printed Jan. 9, 2002, 3 pages.
"Expertise Discovery & Search", http://www.tacit.com/products/espdiscovery.html, printed Jan. 9, 2002, 2 pages.
Vivacqua, Adriana, et al., "Agents to Assist in Finding Help", *Conference on Human Factors & Computing Systems Proceedings*, in the Hague, the Netherlands, Apr. 2000, pp. 65-72.
Tacit, KnowledgeMail & KnowledgeMail Plus, "Creating the Smarter Enterprise" (Tacit Knowledge Systems, Inc., © May 2001). http://www.forbes.com/global/2001/0205/088_print.html, as it appears on Feb. 26, 2001.
McDonald, David W., "Evaluating Expertise Recommendations", *Proceedings of the 2001 International ACM SIGGROUP Conference on Supporting Group Work*, in Boulder, Colorado, Oct. 2, 2001, pp. 214-223.
http://www.tacit.com, as it appears on Dec. 7, 2000.
Wang, Jidong, et al., "Ranking User's Relevance to a Topic Through Link Analysis on Web Logs" *Proceedings of the 4th International Workshop on Web Information and Data Management in* McLean, Virginia, ACM Press, Nov. 8, 2002, pp. 49-54.
Raschid, Louiqa, et al., "Interoperable Query Processing with Multiple Heterogeneous Knowledge Servers", *ACM*, 1993, pp. 461-470.
Jenkins, Clare, "User Studies: Electronic Journals and User Response to New Modes of Information Delivery", *Library Acquisitions: Practice & Theory*, vol. 21, No. 3, 1997, pp. 355-363.
Lessler, J. et al., "Dynamic Interest Profiles Tracking User Interests Using Personal Information", ICEIS Apr. 17, 2004, pp. 281-288 (1 pg.).
Reyle, U. et al., "Ontology driven information extraction." In Proc. of the 19th Twente Workshop on Language Technology, University of Twente, pp. 41-50, 2001.

(56) References Cited

OTHER PUBLICATIONS

Thanopoulos, A. et al. "Text Tokenization for Knowledge-free Automatic Extraction of Lexical Similarities."Electrical and Computer Engineering Department, University of Patras, TALN, Jun. 11-14, 2003, 6 pg.
Whittaker, S. et al., "Contact management: identifying contacts to support long-term communication," in ACM Proc. of 2002 ACM Conf. on Computer Supported Cooperative Work, pp. 216-225, 2002.
Yang, Y. et al., "A comparative study on feature selection in text categorization." In ICML, vol. 97, pp. 412-420, 1997.
U.S. Appl. No. 10/926,735, Non-Final Office Action, Feb. 8, 2007, 11 pg.
U.S. Appl. No. 10/926,735, Final Office Action, Jul. 26, 2007, 12 pg.
U.S. Appl. No. 10/926,735, Examiner's Answer to Appeal Brief, Jul. 7, 2009, 13 pg.
U.S. Appl. No. 10/926,735, Patent Board Decision, May 27, 2010, 14 pg.
U.S. Appl. No. 10/926,735, Notice of Allowance, Aug. 4, 2010, 4 pg.
U.S. Appl. No. 11/094,031, Non-Final Office Action, Jun. 25, 2007, 17 pg.
U.S. Appl. No. 11/094,031, Final Office Action, Jan. 10, 2008, 21 pg.
U.S. Appl. No. 11/094,031, Non-Final Office Action, Jul. 17, 2008, 13 pg.
U.S. Appl. No. 11/094,031, Non-Final Office Action, Feb. 4, 2009, 15 pg.
U.S. Appl. No. 11/094,031, Final Office Action, Sep. 15, 2009, 15 pg.
U.S. Appl. No. 11/094,031, Non-Final Office Action, Mar. 2, 2010, 15 pg.
U.S. Appl. No. 11/094,031, Final Office Action, Jul. 20, 2010, 20 pg.
U.S. Appl. No. 11/094,031, Pre-Appeal Conference Decision, Dec. 9, 2010, 2 pg.
U.S. Appl. No. 11/094,031, Examiner's Answer to Appeal Brief, Mar. 18, 2011, 21 pg.
U.S. Appl. No. 11/094,031, Patent Board Decision, Feb. 27, 2014, 8 pg.
U.S. Appl. No. 11/094,031, Notice of Allowance, May 12, 2014, 5 pg.

* cited by examiner

MONITORING A COMMUNICATION AND RETRIEVING INFORMATION RELEVANT TO THE COMMUNICATION

FIELD OF THE INVENTION

This invention relates generally to the field of information retrieval, and more particularly to a system and method for monitoring a communication, and providing users with information retrieved from one or more data sources that may be relevant to the communication.

BACKGROUND OF THE INVENTION

The rise in popularity of the Internet, along with general advances in computer networking technology, has served to expand the possible means by which people may communicate and receive and disseminate information. Electronic mail, newsgroup discussions, web-chats, and instant messaging, for example, illustrate means of communication that may be as common for some individuals as telephone calls or face-to-face meetings are for others.

As a result, many individuals on a global level are being afforded increased opportunities to access information (or participate in virtual meetings, discussions, or other forums) that may cover a plurality of topics. Such opportunities, however, may be accompanied by an increased likelihood that individuals may receive information or be drawn into forums regarding topics for which they have little or no knowledge.

In the business world, for example, it is not uncommon for executives or officials in large organizations to be copied on numerous electronic mail messages that may include unfamiliar acronyms, topics, or names relating to various topics, projects, or initiatives. To stay current and familiarize themselves with industry buzzwords or terms of art, these executives may use a search engine to execute a search for relevant information across one or more networks.

One drawback associated with many search engines, however, is that users are typically prompted to provide what they believe to be the most appropriate keywords or search parameters. This may be disadvantageous in situations where users have little or no knowledge concerning a particular topic, or are unsure of how to structure the search.

In addition, search engines, as well as other information retrieval systems and methods, may be of little value in situations where individuals need real-time access to information. For example, it is not uncommon for business executives or other individuals to find themselves in a meeting or forum where the discussion has evolved into an area that they have little or no knowledge of. Moreover, it is not unusual for sales or customer representatives to find themselves in a client meeting where a question has arisen that they are unsure of how to answer. In these and other situations, the probability of detouring a meeting to execute a search for information seems unlikely.

These and other drawbacks exist.

SUMMARY OF THE INVENTION

The invention solving these and other problems relates to a system and method for monitoring a communication, and providing users with information retrieved from one or more data sources that may be relevant to the communication.

According to an embodiment of the invention, a computer server, operating system, or other platform may host an information module. The information module may comprise a software program, an Internet web site, or other host site or application maintained by a service provider, or other entity. The information module may, in one embodiment, comprise a contextual topic monitor (CTM) agent for monitoring a communication, and for providing users with information retrieved from one or more data sources that may be relevant to the communication. The CTM agent may further comprise a customization module, a monitoring module, a topic filter module, a search module, and a results module, each of which may implement the various features and functions of the invention as described herein.

In operation, one or more users may access the CTM agent through a remote client. The remote client may include any device associated with or present during a communication. According to an embodiment of the invention, a communication may include any real-time voice communication such as a telephone call or face-to-face conversation, regardless of the duration or number of participants involved. A communication may also include the transmission or receipt of a single text message, or the transmission or receipt of a plurality of messages or postings comprising a real-time, text-based discussion, meeting, or other forum. Any other means by which information is exchanged may also be considered a communication.

According to an embodiment of the invention, the monitoring module of the CTM agent may receive a communication as input. Upon receiving a communication as input, the monitoring module may preferably forward the communication in real-time to the topic filter module.

According to an embodiment of the invention, the topic filter module may then analyze the communication to filter out and produce a running list of words that may define the context or key topics of the communication. A weighted averaging algorithm may be used to extract the relevant topic words in the communication. As the topic filter module continues to analyze the communication in real-time, it may update the running list so as to reflect the evolution of the topic(s) of the communication.

The search module may then utilize one or more of the topic words identified by topic filter module as search terms in a search executed against one or more data sources. The one or more data sources may comprise any combination of databases and other data storage or query formats, platforms, or resources. In this regard, a user of remote client does not have to formulate their own search terms, or even activate the search, while engaged in a communication.

After the search module has executed a search, the results module may format the results and transmit them to the remote client in real-time, according to one or more specified parameters. A results display may be presented to users for displaying the search results in any number of known formats. For example, the results display may include links to documents or resources, such as hypertext links, hot links, or other known navigational tools that enable users to select, access, or display information. The results display may also include the full text of each document or resource identified during the search, or a brief synopsis of each identified search result. Other formats may be presented.

For each result displayed in the results display, a user may have the option to save, print, or discard the result. Additional options may be presented to users depending on, for example, the particular remote client that a user has linked to the CTM agent. The results display may be updated to reflect the evolution of the topic or topics of the communication. As described in detail below, the frequency of the update may be selected by users or established by the system.

One or more of the various features and functions of the modules comprising the CTM agent may be customized by a user, via a customization module. A view or screen display associated with the customization module may be displayed when a user first accesses the CTM agent. This view may enable a user to select from various options. For example, a user may be permitted to select the types of communications that the monitoring module of the CTM agent may monitor. Users may also be permitted to select from one or more of the various data sources available that the search module may execute a search against. In addition, users may specify whether search results are to be received via electronic mail, displayed on a designated intranet or Internet site, or presented in a "pop-up" window, or other view. According to an embodiment of the invention, a user may designate one or more remote clients as recipients of the search results, and also specify the number of search results to be received at any one time.

One advantage provided by the invention is that the coupling of the CTM agent to one or more data sources enables users of remote clients to have real-time access to resources that are relevant to the context of the communication to which they may currently be associated. This may empower the user with knowledge and expertise sources that match the evolution of the topic(s) of the communication.

Another advantage of the invention is that the topic filter module may analyze a communication to filter out and produce a running list of words that the search module may then utilize as search terms in a search executed against one or more data sources. Thus, a user is not required to activate a search, nor determine what search terms or parameters to use.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE PRESENT INVENTION

Figure 1:
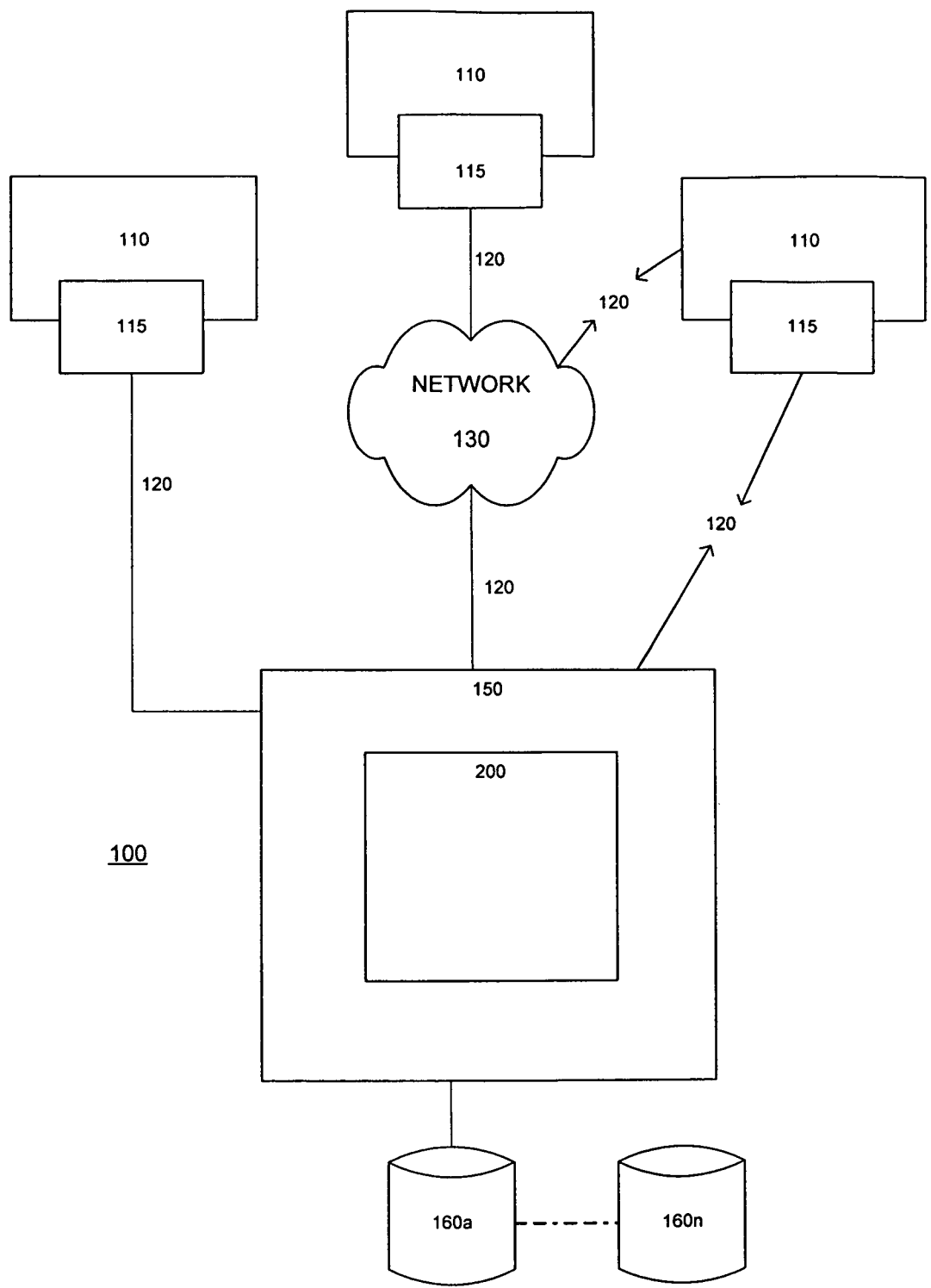
FIG. 1 is a schematic diagram of a system for monitoring a communication and providing users with information retrieved from one or more data sources that may be relevant to the communication, according to an embodiment of the invention.

With reference to FIG. 1, a system 100 is provided, according to one embodiment of the invention, which may comprise a server 150. Server 150 may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

An information module 200 may be stored on server 150, loaded on to server 150, or operated by server 150. Information module 200 may comprise a software program, an Internet web site, an intranet site, or other host site or application maintained by a service provider, or other entity.

Figure 2:
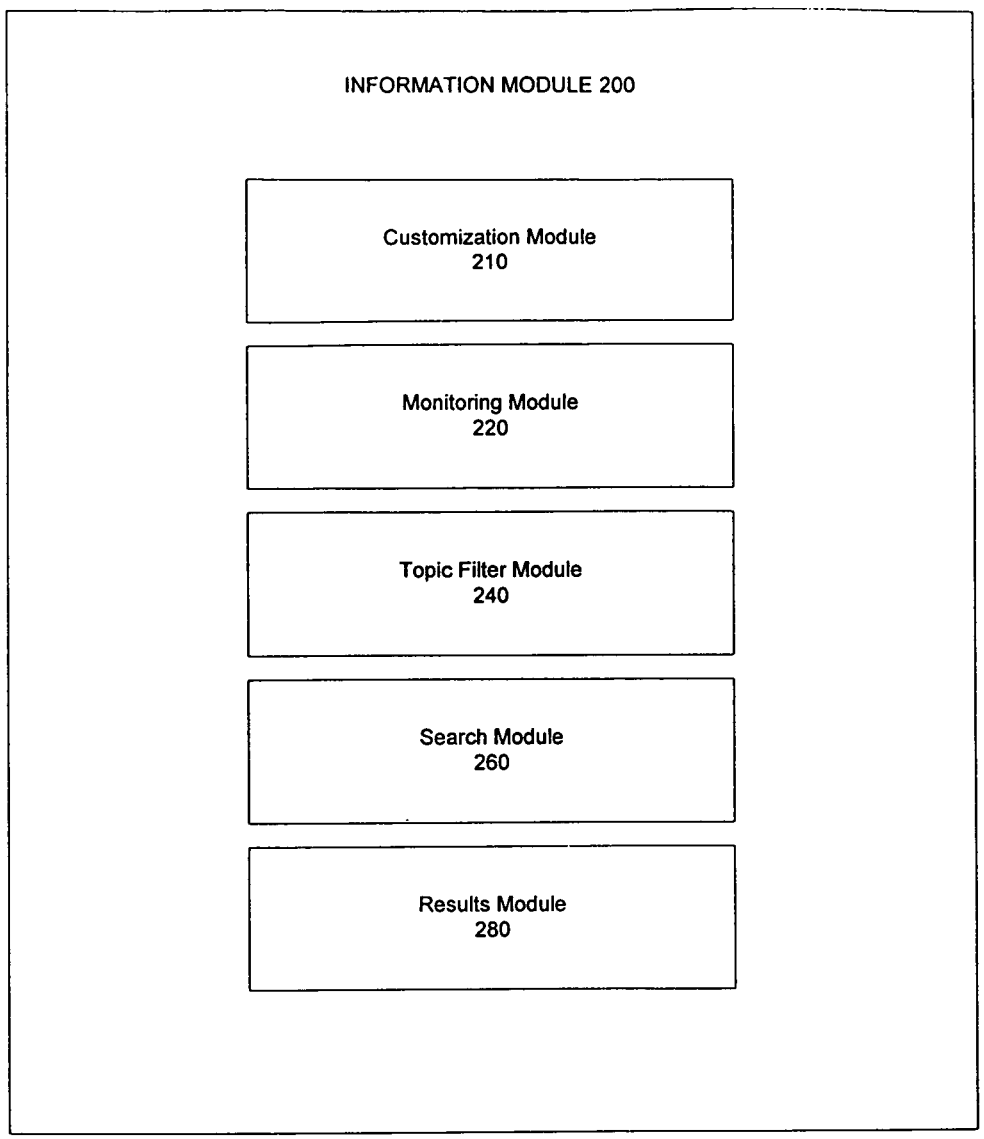
FIG. 2 is a schematic diagram of an information module, according to an embodiment of the invention.

According to an embodiment of the invention, information module 200 may comprise a contextual topic monitor (CTM) agent for monitoring a communication, and providing users with information retrieved from one or more data sources that may be relevant to the communication. As illustrated in FIG. 2, information module (or CTM agent) 200 may further comprise a customization module 210, a monitoring module 220, a topic filter module 240, a search module 260, and a results module 280, each of which may implement the various features and functions of the invention as described herein. Additional modules may be provided. One or more of the modules comprising information module 200 may be combined. For some purposes, not all modules may be necessary.

As illustrated in FIG. 1, one or more data sources 160a-160n may be operatively connected to server 150. Data sources 160a-160n may comprise any combination of databases and other data storage or query formats, platforms, or resources. Examples of databases may include the Oracle™ relational database sold commercially by Oracle Corporation, as well as Informix™ and DB2 (Database 2). Other databases may also be used. Examples of additional data storage or query formats, platforms, or resources, may include a knowledge management (KM) repository, a search engine, OLAP (On Line Analytical Processing), SQL (Standard Language Query), a SAN (storage area network), and Microsoft Access™. Other data sources may also be used, incorporated, or accessed into the invention.

In operation, one or more users may access information module 200 through an interface 115. According to an embodiment of the invention, interface 115 may comprise a graphical user interface (GUI) that may display various modules and functions available to a user via a remote client 110.

Remote client 110 may include any device associated with or present during the communication of information. For example, remote client 110 may comprise a personal computer, portable computer, PDA (personal digital assistant), workstation, dumb terminal, or other device that may be used to send, receive, or access any number of text-based messages. According to an embodiment of the invention, these devices may also be configured with known hardware and/or software to enable voice recognition. A personal or portable computer having voice recognition capabilities that is functioning during a live business meeting or conference call, for example, may comprise a device associated with the communication of information. Additional devices, including a web-enabled mobile phone, WAP device, or web-to-voice device are further examples of devices which may comprise remote client 110.

Remote client 110 may be networked directly to server 150, or connected over a network 130 to server 150 via a communications link 120.

Network 130 may include any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Communications link 120 may include any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or a wireless connection.

Referring now to FIGS. 1 and 2, one or more individuals may participate in a communication associated with at least one remote client 110. Monitoring module 220 may monitor the communication by receiving either all (or a portion of) the communication as input. According to an embodiment of the invention, a communication may include any real-time voice communication such as a telephone call or face-to-face conversation, regardless of the duration or number of participants involved. A communication may also include the transmission or receipt of a single text message (e.g., an electronic mail message), or the transmission or receipt of a plurality of messages or postings comprising a real-time, text-based discussion, meeting, or other forum (e.g., a web chat). Any other means by which information is exchanged may also be considered a communication.

Upon receiving a communication as input, monitoring module 220 may preferably forward the communication in real-time to topic filter module 240.

According to an embodiment of the invention, topic filter module 240 may then analyze the communication to filter out and produce a running list of words that may define the context or key topics of the communication.

A weighted averaging algorithm may be used to determine one or more "likely active topics" (LAT) comprising a communication, based on extracted, relevant topic words from the communication. According to an embodiment of the invention, the weighted averaging algorithm may comprise an extraction process, a context-based refinement process, and an occurrence re-factoring process, each of which may be utilized to generate a LAT list for a particular communication, preferably in real time. Additional processes may be used. One or more processes may be combined and, in certain implementations, not all processes may be necessary.

According to an embodiment of the invention, an extraction process may be used to extract initial probable topics from the communication and return a raw topic vector. As described in greater detail above, a communication may comprise text-based communication (e.g., electronic mail, web chat, text-messaging, etc.) or voice communication, among other communication formats.

With regard to text-based communications, the invention may incorporate existing topic-extraction algorithms for electronic text (e.g., Lotus Discovery Server™) to generate a raw topic vector.

With regard to voice communications, the extraction process may utilize or incorporate voice/speech recognition mechanisms (e.g., a speech recognition engine) to resolve an audible sound input (e.g., spoken word or words) against a dictionary or other word data source (not illustrated) to return a list of word matches in order of likelihood (e.g, based on probabilities). For example, as an exemplary illustration, a voice communication may comprise a spoken conversation between two individuals. One individual may utter the word "dog," and a speech recognition engine may generate a raw topic vector comprising a list of several potential matches for the word, with accompanying probabilities: fog?10%; log? 18%; bog? 13%; etc.

Currently, many voice/speech recognition systems focus on recognizing one voice away from background noise, and attempt to refine the likelihood that a spoken word has been properly identified by the system based in part on lexical context of previous words or subsequent words using refinement post-processing techniques. Unfortunately, such systems that apply one-voice filtration and lexical refinements tend to yield unreliable results when several voices are speaking, particularly if the system is trained against one voice. As such, according to an embodiment of the invention, one-voice refinement post-processing and/or filtering techniques may not be used. Rather, a context-based refinement process (or multi-voice topic-averaging process) may be performed on the raw topic vector.

In one implementation, the raw topic vector may be subjected to a context-based refinement (or topic averaging) process that refines the raw topic vector against the context of other near-in-time vectors, resulting in a refined vector. According to one embodiment, and with further reference to the exemplary "dog" illustration provided above, the topic averaging process may compare recently generated raw topic vectors for a predetermined time interval (e.g., for the previous two minutes) to strengthen the probability of the likelihood that a "dog" or dogs is a topic of the conversation between the two individuals.

With regard to text-based communications, the topic averaging process may compare recently generated raw topic vectors for a predetermined number of text-based characters (or other suitable metric) to strengthen the probability that contextual topic word(s) are accurate. Accordingly, the context-based refinement (or topic averaging) process may increase probabilities for both voice communication and text-based communication by 15-20%.

Moreover, in various embodiments, the context-based refinement (or topic averaging) process may further comprise additional refinement processes or context filters such as, for instance, activity context, user context, taxonomy-parent or synonym word look-up, involved-participant context, or topical urgency context. Such additional refinement processes may enhance probabilities for both voice communication and text-based communication by 50-100%. As an example, the aforementioned refinement processes or context filters may draw on user contexts such as mobile-phone location (when applicable and/or available), or profiles of participants listed for a given meeting on an e-calendar or other collaborative on-line meeting tool.

According to an embodiment of the invention, the refined vector that results from the context-based refinement process may then be subjected to an occurrence re-factoring process, thus resulting in a re-factored & refined vector. The re-factored & refined vector may be the subject of a search executed against one or more data sources as facilitated by the search module (described in greater detail below). It should be recognized that a high degree of certainty resulting from execution of the extraction and context-based refinement processes may indicate a high degree of certainty that a given topic is "active" for a given, current point-in-time topic vector. A final process performed on a refined vector may perform occurrence re-factoring. The invention may utilize tunable decay rate parameters and functions that can be adjusted against empirical tests for optimized default decay rates and curves, and then the occurrence re-factoring process may apply these curves to a current refined vector, deriving again from some predetermined time interval (or number of text-based characters) of prior vectors. A resulting re-factored & refined vector may include an additional relative priority value attached to each topic word. As an exemplary illustration, "dog,66%; cats,73%" may become "cats,66%,100%; cars,54%,50%; and dog,73%,30%". According to this example, the "cats" topic was found more than any other topic within the decay bell-curve, so it is listed as the most active topic at 100% relative priority. The "cars" topic was injected into the current topic vector because it exists in older topic vectors at accuracy rating 54% and its importance may not decay completely to 0%, for example, for another 3 minutes. If "cars" as a topic does not appear again, it may appear in subsequent vectors with lower & lower priority until 0% priority is reached, at which point it may be dropped. If "cars" appears occasionally, then the decay rate may slow or may even reverse. Additionally, if the occurrence rate becomes high enough for "cars," then the relative priority for this topic may climb. Finally, in this example, "dogs" remained in the vector but its frequency of prior occurrence is so low that its priority drops. As such, in an exemplary illustration of a live voice conversation, or multi-way text chat session between numerous participants may yield the following results: (pass1)→"dogs,20%; cats, 18%;" (pass2)→"dogs,66%; cats,73%;" (pass3)→"cats, 66%,100%; cars,54%,50%; dog,73%,30%." This kind of vector, recalculated at a given time interval (e.g., every second), may guide searches against one or more data sources as described below.

According to an embodiment of the invention, search module 260 may utilize one or more of the topic words identified by topic filter module 220 as search terms in a search executed against one or more of data sources 160a-160n. In this regard, a user of remote client 110 does not have to formulate their own search terms, or even activate the search, while engaged in a communication. By coupling information module (CTM agent) 200 to one or more data sources 160a-160n, a user of remote client 110 may be presented with access to knowledge reports of experts, various documents, information, or other resources relevant to the context of the communication to which they may currently be associated. This may empower the user with knowledge and expertise sources that match the evolution of the topic(s) of the communication.

Figure 3:
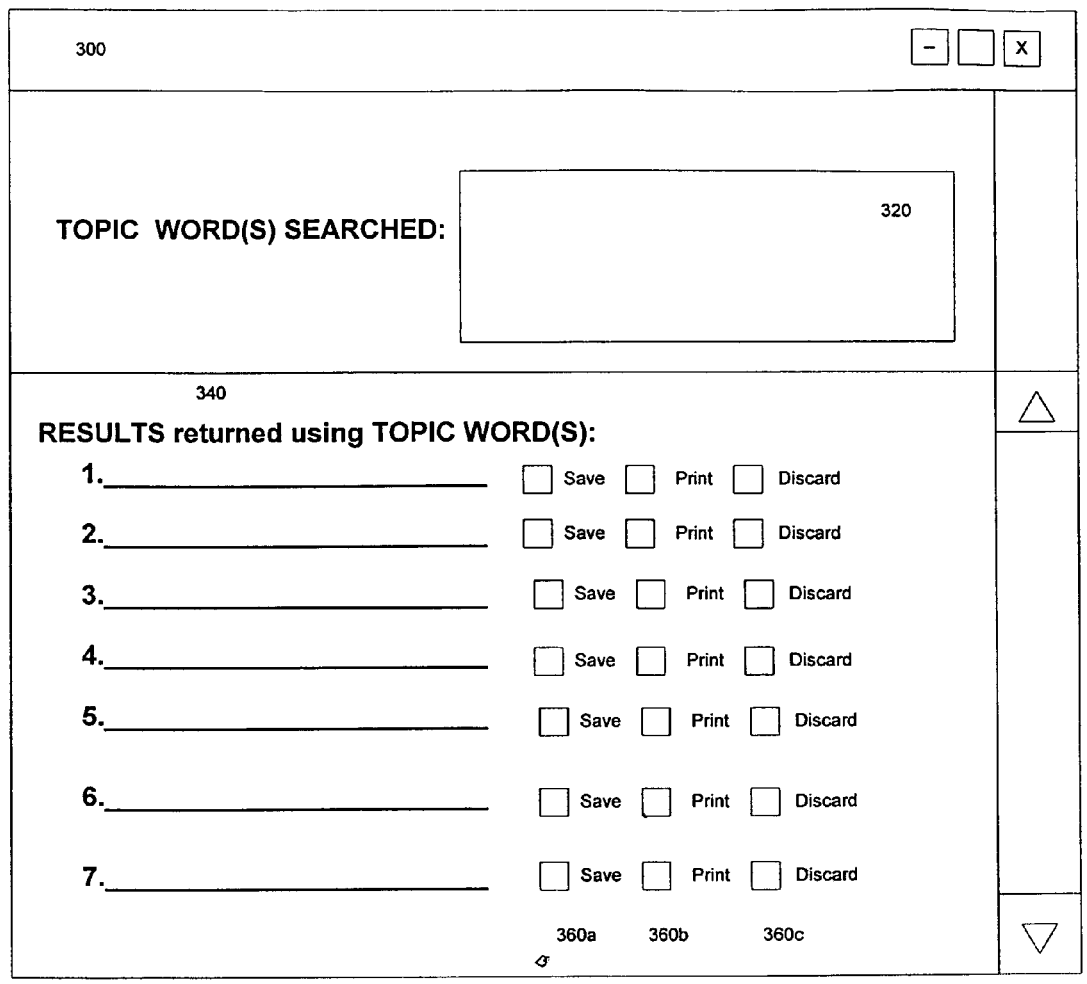
FIG. 3 depicts a view illustrating an embodiment of a results module, according to an embodiment of the invention.

After search module 260 has executed a search, results module 280 may format the results and transmit them to remote client 110 in real-time, according to one or more specified parameters. FIG. 3 depicts a view 300 illustrating an embodiment of results module 280 according to an embodiment of the invention. View 300 may comprise a topic word display 320 and a results display 340. Additional displays may be presented in view 300. Topic word display 320 may display one or more of the topic words generated by topic filter module 240 that were used as search words by search module 260. Results display 340 may display any number of results in any number of known formats. For example, results display 340 may include links to documents or resources, such as hypertext links, hot links, or other known navigational tools that enable users to select, access, or display information. Results display 340 may also include the full text of each document or resource identified during the search, or a brief synopsis of each identified search result. Other formats may be presented.

For each result displayed in results display 340, a user may have the option to save, print, or discard the result by selecting one or more of selection portions 360a, 360b, and 360c respectively. Additional options may be presented to users through additional selection portions. The selection portions available to users, as well as the means used to select them, may vary dependent upon the particular remote client 110 used to access information module 200 and receive results. For example, in an embodiment where remote client 110 comprises a personal or portable computer, a user may select one or more of the selection portions (360a, 360b, 360c) using a keyboard, mouse, or other known input device. In an embodiment where remote client 110 comprises a web-enabled mobile phone, however, results display 340 may prompt a user to press a key on the numeric keypad of the phone to save or discard a result.

Both the topic word display 320 and results display 340 may be updated to reflect the evolution of the topic or topics of the communication. As described in detail below, the frequency of the update may be selected by users or established by the system. If a user has selected to save a result in results display 340, the result may continue to be displayed even after the display has been updated with new search results.

Figure 4:
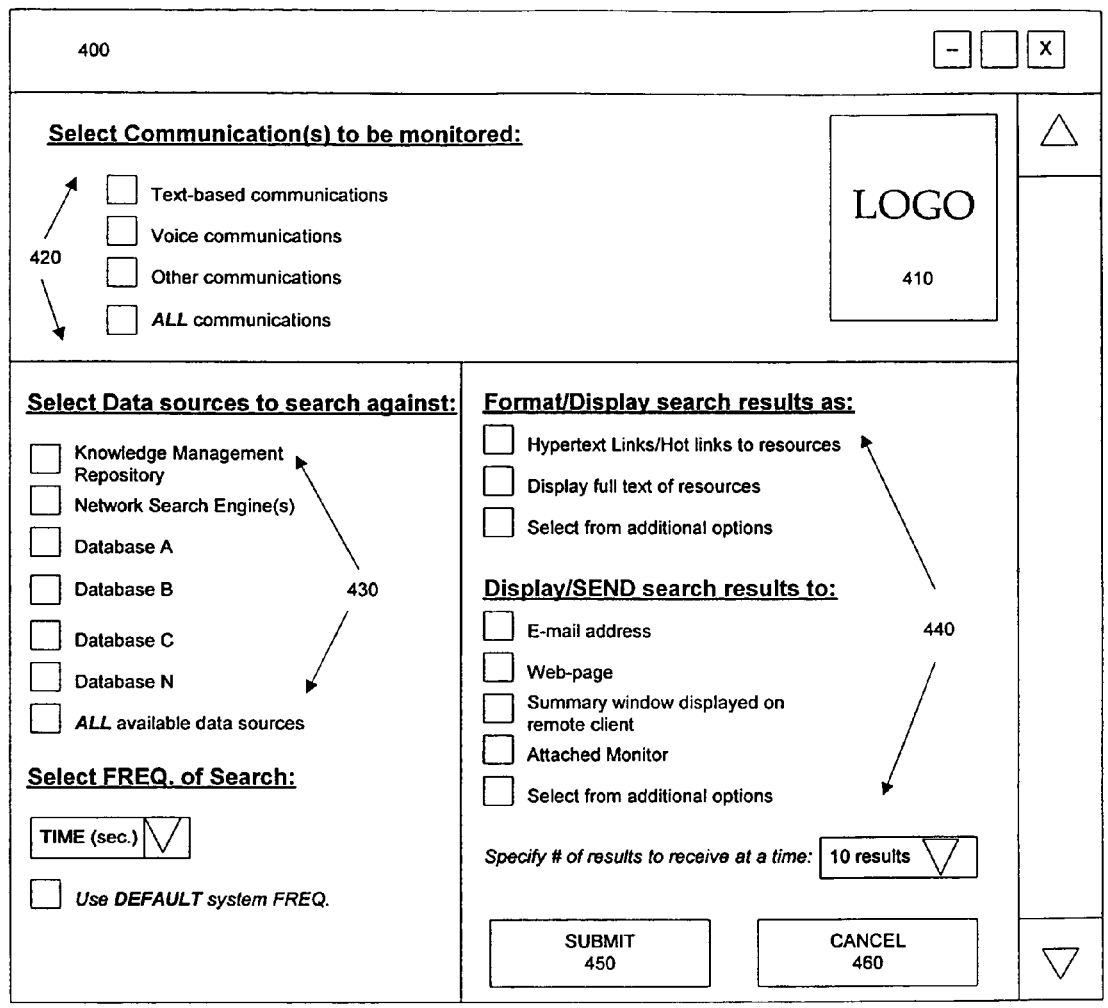
FIG. 4 depicts a view illustrating an embodiment of a customization module, according to an embodiment of the invention.

One or more of the various features and functions of the modules comprising information module 200 may be customized by a user, via customization module 210. FIG. 4 depicts a view 400 illustrating an embodiment of customization module 210, according to an embodiment of the invention.

View 400 may be displayed when a user first accesses information module 200. View 400 may, according to one implementation, include a logo box 410 for displaying text, a logo, or any other icon, symbol, or graphic. Logo box 410 may serve an aesthetic function, or may display an advertisement, or a trademark (or graphic) identifying the service provider or entity maintaining information module 200. One or more logo boxes 410 may be present. View 400 may further comprise a first data field 420, second data field 430, and a third data field 440, each of which may include various selection portions that enable users to specify preferences. Other data fields may be present. In addition, the selection portions available to users in the various data fields may vary dependent upon the particular remote client 110 used to access information module 200.

According to an embodiment of the invention, first data field 420 may allow a user to select the types of communications that monitoring module 220 may monitor. A user may, for example, choose to monitor text-based communications, voice communications, or other types of communications associated with a remote client 110. A user may also wish to monitor all types of communication associated with a remote client 110.

According to an embodiment of the invention, second data field 430 may allow a user to select from one or more of the various data sources 160a-160n available that search module 260 may execute search against. A user may also select the frequency with which topic filter module 240 updates the list of topic words and executes a search. The update frequency may comprise any interval of time.

Third data field 440 may enable a user to select from a number of formats for which to display search results associated with results module 280, as previously described. For example, a user may wish to receive results via electronic mail, or have results displayed on a designated intranet or Internet site. In addition, results may also be presented in a "pop-up" window or other view. Other display options may be provided.

According to an embodiment of the invention, a user may also specify one or more remote clients 110 (other than that associated with the communication) to receive results. As an illustrative example, assume that a business executive in a meeting is monitoring the meeting discussion via a voice-enabled laptop computer. The business executive may wish to have the search results displayed only on the laptop screen. In this regard, as the results on the laptop screen are quietly updated, the business executive may visually scan the screen without breaking the discussion flow of the meeting. The business executive may, however, wish to have the results presented on a large monitor for each of the meeting participants to see.

According to one implementation, users may also specify the number of search results to be received at any one time. Once a user's options have been selected, a user may submit them by selecting a submit selection portion 450. Selections may also be voided by selecting a cancel selection portion 460.

Figure 5:
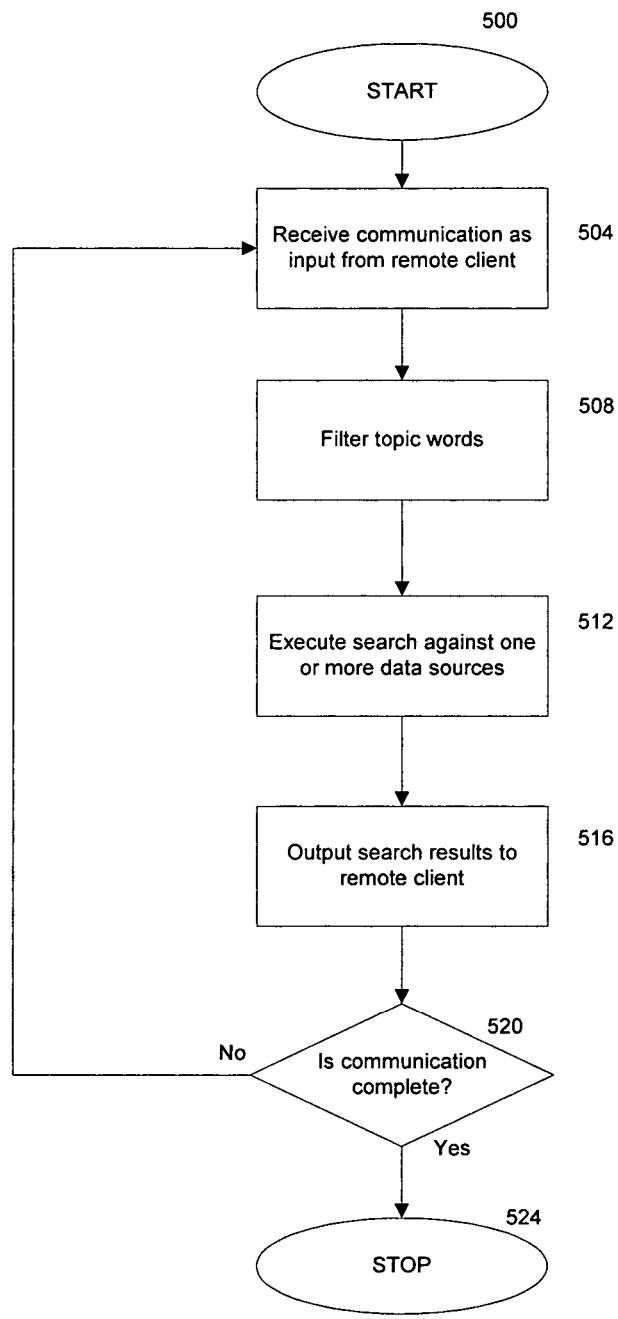
FIG. 5 illustrates a flowchart of processing according to the invention, in one regard.

FIG. 5 illustrates a flowchart of processing according to the invention, in one regard. Processing may begin at step 500. In an operation 504, a monitoring module associated with an information module may monitor a communication associated with at least one remote client by receiving either all (or a portion of) the communication as input. The information module may comprise a software program, an Internet web site, an intranet site, or other host site or application maintained by a service provider, or other entity. In addition to the monitoring module, the information module may further comprise a customization module, topic filter module, search module, and results module, each of which may implement the various features and functions of the invention. Additional modules may be provided.

According to an embodiment of the invention, the communication received may include any real-time voice communication such as a telephone call or face-to-face conversation, regardless of the duration or number of participants involved. The communication may also include the transmission or receipt of a single text message, or the transmission or receipt of a plurality of messages or postings comprising a real-time, text-based discussion, meeting, or other forum. Any other means by which information is exchanged may also be considered a communication. Upon receiving a communication, the monitoring module may preferably forward the communication to a topic filter module for further processing. In an operation 508, the topic filter module may analyze the communication to filter out and produce a running list of words that may define the context or key topics of the communication. A weighted averaging algorithm may be used to extract the relevant topic words in the communication. As the topic filter module continues to receive the communication from the monitoring module in real-time, it may update the running list so as to reflect the evolution of the topic(s) of the communication.

Once one or more topic words have been identified by the topic filter module, the search module may, in an operation 512, utilize one or more of the topic words as search terms in a search executed against one or more data sources. Available data sources may comprise any combination of databases and other data storage or query formats, platforms, or resources. In this regard, a user of a remote client does not have to formulate their own search terms, or even activate the search, while engaged in a communication. By coupling the information module to one or more data sources, a user of a remote client may be presented with access to knowledge reports of experts, various documents, information, or other resources relevant to the context of the communication to which they may currently be associated. This may empower the user with knowledge and expertise sources that match the evolution of the topic(s) of the communication.

In an operation 516, after the search module has executed a search, the results module may format the results and transmit them to remote client in real-time, according to one or more specified parameters. A results display, for example, may be presented to users. The result display may include links to documents or resources, such as hypertext links, hot links, or other known navigational tools that enable users to select, access, or display information. The results display may also include the full text of each document or resource identified during the search, or a brief synopsis of each identified search result. Other formats may be presented.

According to an embodiment of the invention, an inquiry may be made in an operation 520 to determine whether the communication is complete, or is continuing to evolve. If a communication is complete, processing may end at stop 524. Otherwise, processing may be re-entered at step 504.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for monitoring a communication between human individuals and retrieving information relevant to the communication, comprising:
    in a system comprising a network, a server connected to the network and hosting an information module, a first interface to a communications link for connecting the server to a remote client, and a second interface for connecting the server to at least one data source:
    automatically monitoring, via the first interface, a communication between a user associated with the remote client and at least one other individual;
    automatically determining from the monitored communication, in real-time, one or more topic words associated with the monitored communication;
    automatically searching the at least one data source in real-time during the communication for the one or more topic words appearing in the monitored communication to generate search results for documents relevant to the context or the one or more key topics of the communication, wherein
    the monitored communication is a type of communication selected from a plurality of types of communication,
    the at least one data source to be searched is selected from a plurality of data sources, and
    the searching is performed using a predefined frequency
    determining the one or more topic words comprises determining one or more likely active topics by filtering one or more topic words appearing in the communication; and
    outputting the search results to the remote client.

2. The method of claim 1, wherein the network comprises at least one of the Internet, an intranet or a virtual private network.

3. The method of claim 1, wherein the communications link comprises at least one of a digital subscriber line (DSL) connection, a digital data services (DDS) connection, an Ethernet connection, an integrated services digital network (ISDN) line, wireless connection, or an analog modem connection.

4. The method of claim 1, wherein the remote client comprises at least one of a personal computer, personal digital assistant, or a wireless terminal device.

5. The method of claim 1, wherein the at least one data source comprises at least one database or knowledge management (KM) repository.

6. The method of claim 1, wherein the information module comprises an Internet web site or software application.

7. The method of claim 1, wherein the monitoring further comprises receiving the communication as input in real time.

8. The method of claim 1, wherein the communication comprises at least one text message.

9. The method of claim 8, wherein the at least one text message comprises an electronic mail message.

10. The method of claim 8, wherein the at least one text message comprises a plurality of text messages comprising a web chat.

11. The method of claim 1, wherein the communication comprises a voice communication.

12. The method of claim 11, wherein the voice communication comprises at least one of a telephone conference, or live conversation.

13. The method of claim 11, wherein the monitoring further comprises receiving the voice communication as input in real time and converting it to text.

14. The method of claim 1, wherein the filtering further comprises applying the weighted averaging algorithm to the communication at a predetermined frequency.

15. The method of claim 14, further comprising enabling a user associated with the remote client to specify the frequency.

16. The method of claim 14, wherein the information module designates a default frequency.

17. The method of claim 1, wherein providing search results to said user comprises outputting hypertext links to the search results, so that the user associated with the remote client may select the hypertext links to access the search results.

18. The method of claim 1, further comprising enabling the user associated with the remote client to specify one or more parameters.

19. The method of claim 18, further comprising enabling the user to specify the format of the search results.

20. The method of claim 18, further comprising enabling the user to specify the types of communication to be monitored.

21. The method of claim 18, further comprising enabling the user to specify the at least one data source to be searched.

22. The method of claim 1, wherein information relevant to the context or one or more key topics of the communication comprises one or more knowledge reports by experts, documents, or other resources associated with a context or one or more key topics of the communication.

23. The method of claim 1, wherein providing search results to said user comprises providing full text or a brief synopsis of each search result.

24. The method of claim 1, further comprising providing the user with the one or more topic words that were searched.

25. The method of claim 1, wherein providing search results comprises one or more of: sending the search results in an electronic mail message; presenting the search results on a designated intranet or Internet site; displaying the search results in a pop-up window on a display device; or presenting the search results to at least one other individual.

26. The method of claim 1, wherein determining the one or more topic words comprises:
   generating a topic vector comprising a list of several potential matches for a word; and
   refining the topic vector by comparing the topic vector with other topic vectors for a predetermined time interval or number of characters to determine if they share a similar context or one or more key topics.

27. The method of claim 1, wherein determining the one or more topic words comprises filtering by activity context, user context, taxonomy-parent or synonym word look-up, involved-participant context, or topical urgency context.

28. The method of claim 1, wherein determining the one or more topic words comprises:
   generating a topic vector comprising a list of several potential matches for a word; and
   applying at least one tunable decay parameter curve to a topic vector; and
   deriving a re-factored vector based on the occurrence of parameters from some predetermined time interval or number of characters in prior topic vectors.

29. The method of claim 1, wherein the one or more topic words associated with the monitored communication define a context or one or more key topics of the communication.

30. The method of claim 1, further comprising automatically providing search results to said user in real-time during the communication.

31. A method monitoring a communication between human individuals and retrieving information relevant to the communication, the method comprising:
   automatically monitoring a communication between a user and at least one other individual;
   automatically determining from the monitored communication, in real-time, one or more topic words associated with the monitored communication;
   automatically searching the at least one data source in real-time during the communication for the one or more topic words appearing in the monitored communication to generate search results for documents relevant to the context or the one or more key topics of the communication, wherein
   the monitored communication is a type of communication selected from a plurality of types of communication,
   the at least one data source to be searched is selected from a plurality of data sources, and
   the searching is performed using a predefined frequency
   determining the one or more topic words comprises determining one or more likely active topics by filtering one or more topic words appearing in the communication; and
   outputting the search results to the remote client.

32. The method of claim 31, wherein the monitoring further comprises receiving the communication as input in real time.

33. The method of claim 31, wherein the communication comprises at least one text message.

34. The method of claim 33, wherein the at least one text message comprises an electronic mail message.

35. The method of claim 33, wherein the at least one text message comprises a plurality of text messages comprising a web chat.

36. The method of claim 31, wherein the communication comprises a voice communication.

37. The method of claim 31, wherein the voice communication comprises at least one of a telephone conference, or live conversation.

38. The method of claim 31, wherein the monitoring further comprises the step of receiving the voice communication as input in real time and converting it to text.

39. The method of claim 31, wherein the filtering further comprises applying the weighted averaging algorithm to the communication at a predetermined frequency.

40. The method of claim 39, further comprising enabling a user to specify the frequency.

41. The method of claim 39, wherein the information module designates a default frequency.

42. The method of claim 31, wherein providing search results to said user comprises outputting hypertext links to the search results, so that the user associated with the remote client may select the hypertext links to access the search results.

43. The method of claim 31, further comprising enabling the user to specify one or more parameters.

44. The method of claim 43, further comprising enabling the user to specify the format of the search results.

45. The method of claim 43, further comprising enabling the user to specify the types of communication to be monitored.

46. The method of claim 43, further comprising enabling the user to specify the at least one data source to be searched.

47. The method of claim 31, wherein information relevant to the context or one or more key topics of the communication comprises one or more knowledge reports by experts, documents, or other resources associated with a context or one or more key topics of the communication.

48. The method of claim 31, wherein providing search results to said user comprises providing full text or a brief synopsis of each search result.

49. The method of claim 31, further comprising providing the user with the one or more topic words that were searched.

50. The method of claim 31, wherein providing search results comprises one or more of: sending the search results in an electronic mail message; presenting the search results on a designated intranet or Internet site; displaying the search results in a pop-up window on a display device; or presenting the search results to at least one other individual.

51. The method of claim 31, wherein determining the one or more topic words comprises:
   generating a topic vector comprising a list of several potential matches for a word; and
   refining the topic vector by comparing the topic vector with other topic vectors for a predetermined time interval or number of characters to determine if they share a similar context or one or more key topics.

52. The method of claim 31, wherein determining the one or more topic words comprises filtering by activity context, user context, taxonomy-parent or synonym word look-up, involved-participant context, or topical urgency context.

53. The method of claim 31, wherein determining the one or more topic words comprises:
   generating a topic vector comprising a list of several potential matches for a word; and
   applying at least one tunable decay parameter curve to a topic vector; and deriving a re-factored vector based on the occurrence of parameters from some predetermined time interval or number of characters in prior topic vectors.

54. The method of claim 31, wherein the one or more topic words associated with the monitored communication define a context or one or more key topics of the communication.

55. The method of claim 31, further comprising automatically providing search results to said user in real-time during the communication.

56. A computer hardware system, comprising:
   a hardware processor, wherein the hardware processor is configured to perform:
      automatically monitoring a communication between a user and at least one other individual;
      automatically determining, in real-time and from the monitored communication, one or more topic words associated with the monitored communication;
      automatically searching, in real-time during the monitored communication, at least one data source for the one or more topic words appearing in the monitored communication;
      generating, based upon the searching, search results for documents relevant to:
         a context of the monitored communication or
         one or more key topics of the monitored communication, wherein
      the monitored communication is a type of communication selected from a plurality of types of communication,
      the at least one data source to be searched is selected from a plurality of data sources, and
      the searching is performed using a predefined frequency
      the determining the one or more topic words includes determining one or more likely active topics by filtering one or more topic words appearing in the communication; and
   outputting the search results to the user.

57. The system of claim 56, wherein
the monitored communication is a voice communication, and
the voice communication is converted into text.

58. A computer program product, comprising:
a computer readable storage device having stored therein computer readable program code,
the computer readable program code, which when executed on a computer hardware system, causes the computer hardware system to perform:
   automatically monitoring a communication between a user and at least one other individual;
   automatically determining, in real-time and from the monitored communication, one or more topic words associated with the monitored communication;
   automatically searching, in real-time during the monitored communication, at least one data source for the one or more topic words appearing in the monitored communication; and
   generating, based upon the searching, search results for documents relevant to:
      a context of the monitored communication or
      one or more key topics of the monitored communication, wherein
the monitored communication is a type of communication selected from a plurality of types of communication,
the at least one data source to be searched is selected from a plurality of data sources, and
the searching is performed using a predefined frequency
the determining the one or more topic words includes determining one or more likely active topics by filtering one or more topic words appearing in the communication; and
outputting the search results to the user.

59. The computer program product of claim 58, wherein
the monitored communication is a voice communication, and
the voice communication is converted into text.

* * * * *